United States Patent [19]

Shepherd

[11] Patent Number: 5,748,731
[45] Date of Patent: May 5, 1998

[54] ELECTRONIC TRADING CARDS

[76] Inventor: Henry G. Shepherd, P.O. Box 70 Wilsondale St., Dover, Mass. 02030

[21] Appl. No.: 691,566

[22] Filed: Jul. 2, 1996

[51] Int. Cl.$^6$ .................................................. H04K 1/00
[52] U.S. Cl. ............................................................. 380/4
[58] Field of Search ..................... 380/4, 25; 364/479.01

[56] References Cited

U.S. PATENT DOCUMENTS 5,533,124  7/1996  Smith et al. ................................. 380/4

Primary Examiner—David C. Cain
Attorney, Agent, or Firm—Whitham, Curtis, Whitham & McGinn

[57] ABSTRACT

Electronic trading cards are composed of a plurality of individual trading card files encoded on a single data storage device such as a computer diskette or laser disk, each with an associated deciphering key code for deciphering encrypted data in the individual trading card files, and each with a file transfer code which allows individual trading card files to be transferred from one collector to another, without the transferring collector retaining a copy for his or her own use after a transfer is made. The electronic trading cards are organized and viewed using an electronic binder that provides full featured database functions such as sorting, graphic presentation, and the like. The electronic binder tracks the number of identical electronic trading card files possessed by a collector such that he or she will be aware that duplicates or triplicates are available. The electronic binder also has provisions for updatable guides which can provide card valuation and prediction information. Suppliers of the electronic trading cards will select a plurality of individual files for recordation on a data storage device from a very large pool of files assembled by the supplier. The data storage device will include a copy protection code which allows the files on the data storage device to be copied a fixed number of times (i.e., once or twice is preferable). A specific example of electronic trading cards contemplated are electronic baseball cards.

13 Claims, 3 Drawing Sheets

ELECTRONIC TRADING CARDS

BACKGROUND OF THE INVENTION

1. Field of the Invention

The invention is generally directed to trading cards and, more particularly, to electronic trading cards that are stored and retrieved using computer hardware and software, and which can be collected and traded.

2. Background Description

Trading card collections have been a favorite past time for boys and girls for many years. Recently, due to the increased value of trading card collections, many adults have become active collectors of trading cards. The trading cards typically include a photograph of a sports hero on one side, and a collection of statistics, personal information, and the like for the sports hero on the reverse side. The trading cards are sold in packets with several different cards in each packet. The individual cards in each packet are randomly selected from a very large pool of cards produced by a particular supplier of cards. Thus, it is very unlikely that any two packets of cards include the same individual cards. However, due to the large numbers of copies of individual cards which are produced by card suppliers, if large numbers of cards are collected by one person, it is likely that he or she will obtain duplicates, triplicates, and so on, of individual cards.

Trading cards are typically grouped in packets sold only with cards of a specific category. For example, the best known trading cards are baseball cards which feature baseball players in the major leagues in the United States. There are also trading cards that feature basketball players, hockey players, and football players. In addition, there are trading cards which feature U.S. college sports figures such as baseball players. However, it should be understood that trading cards can be produced and collected for almost any category of event. For example, trading cards can be produced which feature foreign sports figures in baseball and soccer, television stars, movie stars, comic strip heroes, mythical warriors, olympians, police dogs, etc. The advantage of grouping the cards in specific categories is that it allows people to collect only the types of cards which suit their individual interests.

Trading cards are typically not sold as complete sets. That is, one cannot or does not ordinarily purchase a complete set of all baseball cards produced by any one supplier in any given year. Rather, he or she will purchase several packets of cards periodically, and his or her respective collection will increase with the number of purchases made over a number of years. In addition, individuals will often "trade" or "swap" one or more cards with other collectors to obtain cards which they desire for their collection; hence, the name "trading card". Furthermore, the pool of cards from which the packets of cards are randomly drawn from changes periodically. For example, new baseball cards are created as individual players enter the major leagues, and, as players retire or leave the sport, the suppliers of cards stop manufacturing cards with that particular player's image and statistics, or will manufacture it only as a commemorative series. Also, for each year a player is involved in a sport, his or her annual statistics and photographic image are updated. Thus, it is possible to have different cards for a single player at different years in his or her career (e.g., Reggie Jackson with the Yankees® and with the Angels®).

Because of the dynamic nature of the pool of cards from which packets are drawn, the large number of individual cards within the pool at any one time, and the extremely large number of trading cards which are produced, even the largest private collections typically constitute only a small fraction of the cards available in any one category. This is part of the appeal of collecting cards. For example, some individuals may prefer to collect trading cards for a particular team (e.g., the Yankees, Dodgers, or Red Sox), others may prefer collecting cards which feature a particular type of player (e.g., pitchers, power hitters, etc.), others may prefer collecting cards from a particular year, others may prefer collecting cards based on a player's statistics (e.g., ERA less than 2.0, or hitting average greater than 300), while others may simply prefer a random assortment of players they prize for any of a variety of reasons. Based on individual preferences, collectors will trade individual cards or sets of cards in their collection for the cards in another collector's collection. Enjoyment is gained both by knowledge of the facts on the individual cards, and by creating collections of cards prized by the individual collector.

Within any category, certain individual trading cards can be more highly valued than other trading cards. This is a product of many complex factors. First, the value assigned to any particular card can be subjective with an individual collector. Second, a particular card may be more highly prized if the featured person on the card is having or has had good performances in his sport or profession, thus, making trading cards featuring that person desired by more people. Third, a particular card may be no longer "in print", except under special circumstances, due to the person featured on the particular card having retired from his sport or profession. The first reason is easy to understand, but hard to quantify; however, the second and third reasons set forth above are related to supply and demand economic relationships. Currently, there are commercially available guides which suggest the market value of a number of different individual cards within a category (e.g., Baseball cards) based on these supply and demand relationships. In addition, there are commercially available guides which predict the future performance of certain athletes in a particular sport, and thus, provide collectors with guidance on cards to trade or keep in their collection.

Despite all of the appeal of trading cards as they are presently manufactured and distributed, there are a number of disadvantages. First, production of trading cards has an adverse environmental impact in that trees are required to make the cards, ink and the like used during manufacturing of the cards poses a waste disposal problem and hazard, and the packages, as well as the cards if they are disposed of, present a waste problem in landfills. Second, flipping through individual cards is cumbersome, time consuming, and can lead to damage and wear on the cards. Third, large collections of cards require large volumes of storage space and extensive cataloging and organizing measures. Fourth, the information on the individual cards is not readily accessible to the collector. Specifically, if a collector wants to sort his or her cards by team, number of home runs or base hits, earned run average (ERA), or by other factors, he or she must look at each individual card to determine if it fits his or her criteria.

SUMMARY OF THE INVENTION

It is an object of this invention to provide electronic trading cards which are stored and retrieved using computer hardware and software.

It is another object of this invention to provide a mechanism which allows electronic trading cards to be collected and traded in a fashion similar to conventional trading cards, but which has the advantages of an electronic format and computerized searching and organizing.

According to the invention, a computer data storage device, such as a magnetic disk, optical disk, laser mini-disk, magnetic tape, or static memory module, includes a plurality of electronic trading cards stored as individual files on the computer storage device. These trading cards can feature information and/or graphics on any subject matter sought to be collected, such as, for example, baseball cards or other "character" or "idol" cards as discussed in detail above, or, alternatively, for example, stamps, coins, post cards, etc. Each of the individual files encoded on the computer data storage device will be randomly drawn from a large pool of electronic files maintained in a separate computer database controlled by the commercial supplier of the electronic trading cards. The number of individual files or "electronic trading cards" supplied on any one computer data storage device will depend on a variety of factors including the needs of the electronic trading card suppliers, the storage capacity of the computer data storage device, and the nature and amount of information stored in each file. To enhance collectability and/or tradeability, the number of individual files on any one computer data storage device purchased by a collector will be a very small fraction of the total pool of files contained in the computer database maintained by the supplier (e.g., less than 1% and preferably less than 0.01%).

In addition, the computer data storage device could also include one or more "special edition" electronic trading cards which would be electronic files that have a special feature different from other electronic trading cards. For example, the special feature may be an audio and/or video clip of a baseball player accomplishing a record, such as Cal Ripken, Jr. surpassing Lou Gehrig's consecutive games streak, or a player performing a specific act, such as a golden glove all star making a spectacular catch. These audio and video clips would be activated for playback by the collector on his or her computer equipment. Alternatively, the "special edition" card could be identical in all respects to other electronic trading cards, except that it is drawn from a separate pool of cards and/or is identified as a special edition cards. For example, a supplier of electronic trading cards may wish to release special edition trading cards of retired baseball legends, or release special edition trading cards of a select group of active baseball players that have certain fan appeal. In the preferred embodiment, a limited amount of edition trading cards (and preferably one) would be provided on the data storage device with the other electronic trading cards, and this special edition trading card would be drawn from a different pool from the pool used for the other electronic trading cards. However, the special edition trading cards would also preferably be identical to the other electronic trading cards with respect to their collectability and tradeability.

A collector will purchase individual computer data storage devices periodically, and will be able to examine the contents of the stored files using an electronic computerized "binder" program. The "binder" program is akin to a file manager or database program, and serves to organize and track individual files, allow various sorting functions to be performed, permit the contents of one or a plurality of files to be presented on a computer display, as well as other useful functions depending upon the nature of the information stored in the individual files. Using the "binder" program, the collector will be able to review not only the files on his or her most recent computer data storage device purchase, but also all files in his or her collection. The binder program will also alert the collector as to the number of duplicate cards he or she has in his or her collection, and will selectively suppress the graphic and or textual information in duplicate files from being displayed simultaneously. Instead, the binder program will provide numeric indicia identifying the number of identical files present in the collection (i.e., duplicates, triplicates, etc.).

An important feature of this invention is to allow electronic trading cards to be "traded" or "swapped" between collectors in a manner similar to that which occurs with ordinary trading cards. In order for this to happen, each electronic trading card must effectively only be able to be copied from the computer data storage device purchased by the collector only a fixed number of times (e.g., once is most preferable, however, twice may also be preferred to allow the original purchaser one archival copy), and, in addition, a mechanism must be provided to permit a collector to trade a copy of the electronic trading card to another collector, but not retain a workable copy of the electronic trading card in his or her own collection. This is accomplished by encrypting the graphical and/or textual data in each electronic trading card, and associating a unique deciphering key code with each card. Thus, a collector must possess both the deciphering key code and the electronic trading card file in order to be able to view the graphical and/or textual information of the electronic trading card. The collector, in order to make a trade, will operate a file transfer code that is unique to each file which will effectively transfer the electronic trading card file, the deciphering key code, and the file transfer code to a temporary storage medium such as a diskette or the like, or will make the transfer directly to the new collector's permanent storage medium by way of a telephone/modem transfer. Transferring the file transfer code, in addition to the deciphering key code and electronic trading card file, allows the new collector to trade the card in the future. At the same time as the electronic trading card transfer is occurring, at least one of the following codes, and perhaps all, will be rendered unusable so that the collector which made the transfer will not retain a working copy of the electronic trading card file: the electronic trading card file, the deciphering key code, and the file transfer code. This can be accomplished by deleting one or all of the files from the first collector's hard disk (or other computer storage device) during file transfer, or by providing a scrambling code which scrambles one or all of the files. It is most preferable to render the electronic trading card file or deciphering key code unusable so that the card can no longer be viewed by the original owner; however, in certain situations it may be desirable to allow a user to retain a card for viewing purposes only, in which case, the file transfer code only would be made unusable.

The electronic binder and the computer format of the electronic trading card will provide a number of advantages to the collector. For example, since the cards are not "handled" except electronically, they will not deteriorate with time. In addition, the electronic format may allow for features which cannot be realized with ordinary cards such as computer animation of a ball player (e.g., an electronic trading card could be made which would allow one to view the swing of a power hitter in baseball or the unique pitching style and delivery of a pitcher in baseball). Also, the electronic binder will preferably be equipped with database features that allow sorting, categorizing and the like. Thus, a baseball collector, for example, could quickly obtain a subset of his or her collection which only features hitters that are hitting over 0.300, or a subset that includes members of only one baseball team, etc.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
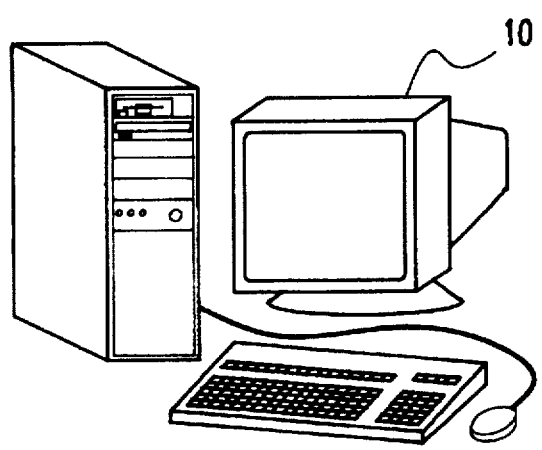
FIG. 1 is an isometric view of a personal computer.
Figure 2:
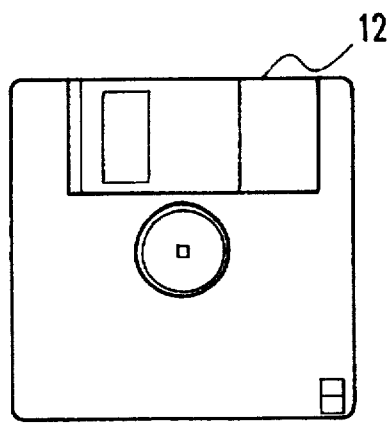
FIG. 2 is a plan view of a computer diskette.

FIGS. 1 and 2 illustrate that this invention is concerned with the representing electronic trading cards on a computer 10 where the electronic trading cards are stored on a data storage device 12 such as a diskette, laser/optical disk or other suitable device (e.g., mini disk, magnetic tape, memory modules, etc.). The computer 10 and data storage device 12 can be varied widely within the practice of this invention.

Figure 3:
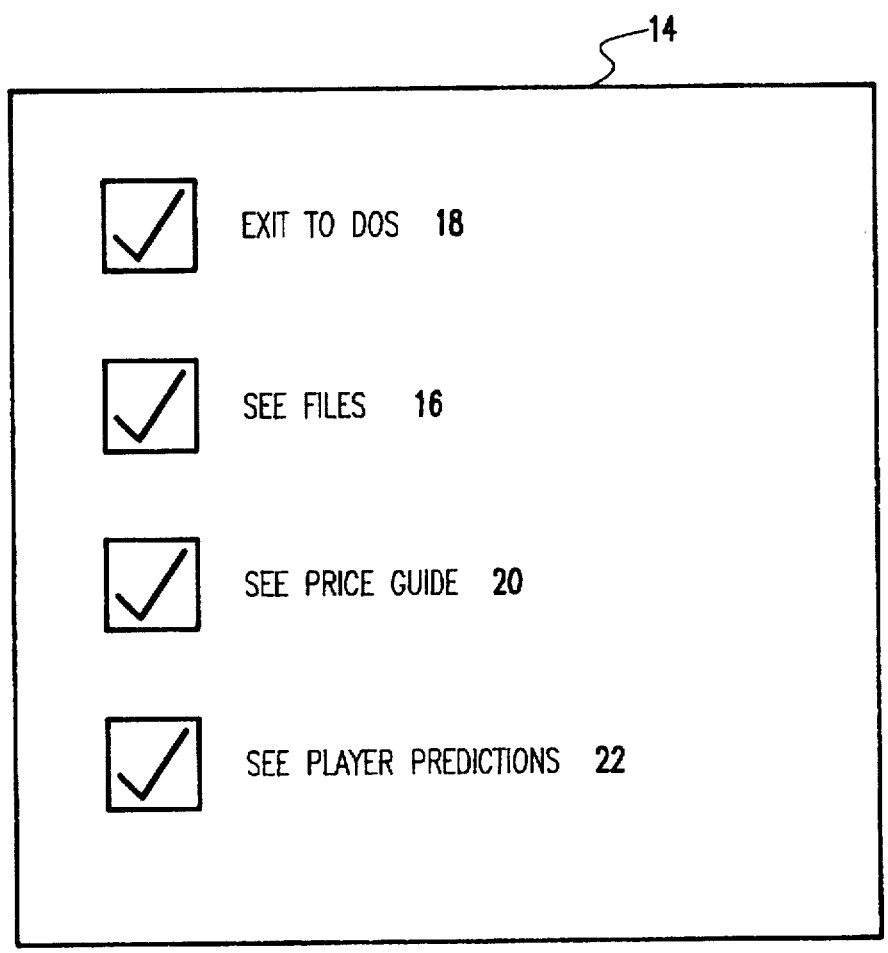
FIG. 3 is a plan view of a main menu screen.

FIG. 3 illustrates one example of a main menu 14 which may be used for electronic trading cards, and this main menu 14 has particular application to electronic trading cards which feature sports figures such as baseball players. As discussed extensively above, virtually anything can be collected and traded, and this invention contemplates the collection of computer representations on almost any subject matter (e.g., baseball players, hockey players, basketball players, football players, soccer players, olympians, movie stars, political figures, stamps, post cards, coins, etc.). The main menu 14 in FIG. 3 can be varied widely depending on the items being collected or the needs of individual collectors, as well as on other factors. The main menu 14 is viewed as an entry into an "electronic binder" program which is used to store, categorize, sort, display, and transfer electronic trading cards. As such it is equipped with an Entry 16, identified as "See files", and an Exit 18, identified as "Exit to DOS". Obviously, the indicia can be varied, icons may be used, and alternative operating systems to DOS can be used.

The main menu 14 can also provide access to any supplemental files of the "electronic binder", such as, for example, a price guide 20 and a player prediction guide 22. These supplemental files or guides 20 and 22 would be used in conjunction with the electronic trading cards, and could be updated periodically (e.g., monthly, annually, etc.). In a particular example, the price guide 20 would be a listing of all or a large number of electronic baseball cards which have been manufactured and distributed by a particular supplier giving the name of a featured player and a value for the electronic baseball card. This is akin to paperback price guides currently in use by collectors of conventional baseball cards. The player prediction guide 22 would provide a short synopsis of each player in the pool of players or other individuals being featured in electronic trading card format and provide predictions for his or her future performance. A particular advantage of the computerized electronic binder format is that a collector should be able to hot key between cards in his or her own collection and the price guide 20 or player prediction guide 22, thereby quickly determining the value of the card and identifying criteria which may figure into his or her determination to trade; thus, eliminating the need to flip through guide books.

Figure 4:
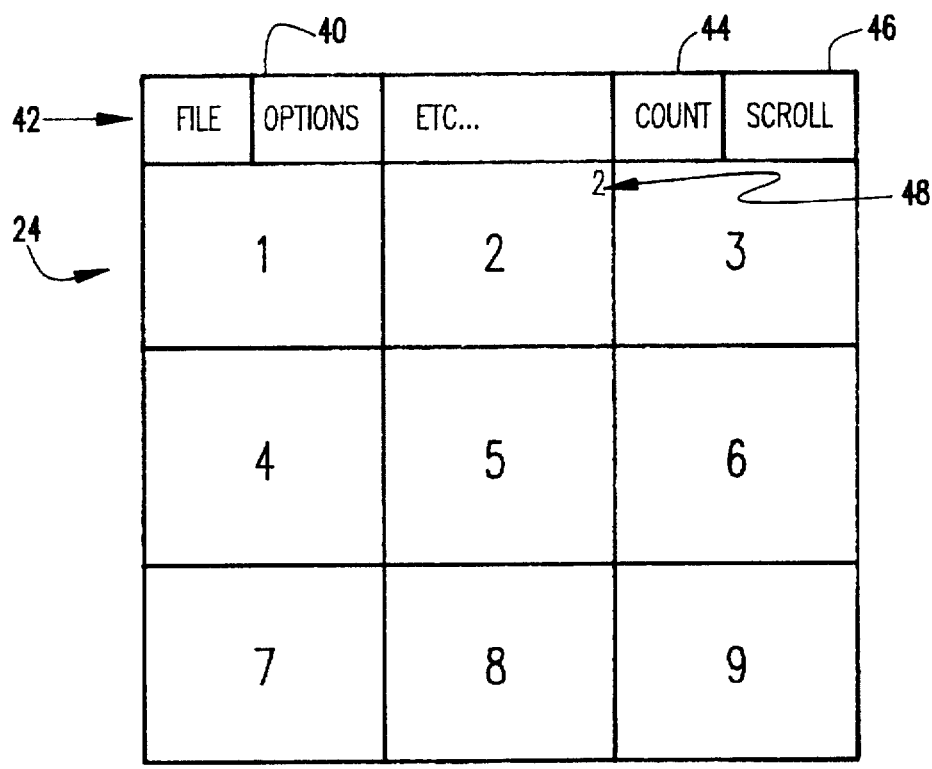
FIG. 4 is a plan view of a screen which allows portions of several electronic trading cards to be viewed simultaneously.

FIG. 4 shows a presentation of nine different electronic trading cards simultaneously on a single presentation page 24. This can be, for example, the graphic images of nine different baseball players, nine different stamps, etc. The number of cards which can be displayed as well as the type of information text or graphics which can be displayed on the presentation can be varied to suit the needs of the collector, electronic card supplier, or the like. For exemplary purposes only, if each of the cards were different baseball players, a collector would simply click on a particular player using a mouse or other input device to produce more detailed information for that player.

Figure 5:
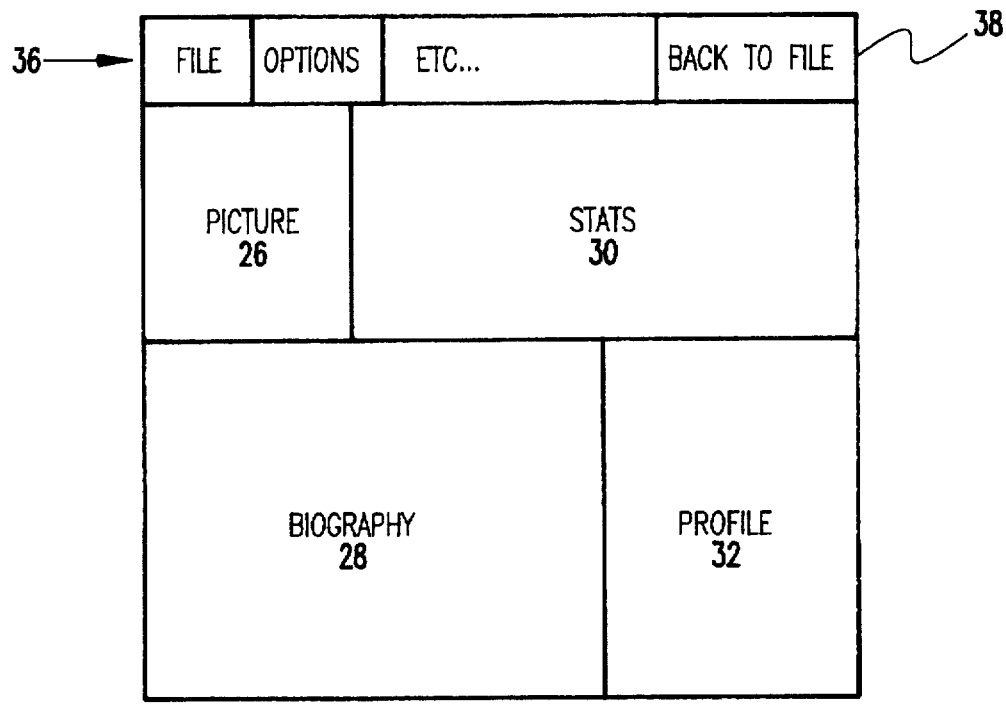
FIG. 5 is a plan view of a screen showing an expanded presentation of a single electronic trading card.

FIG. 5 shows an expanded presentation for a single electronic trading card which, in the case of baseball cards, could include the player's picture 26, a biography 28 (minor league affiliations, major league teams, accomplishments (e.g., golden glove, batting titles, etc.), and the like), statistics 30 (e.g., hits, runs, RBIs, errors, etc.), and profile 32 (e.g., height, weight, etc.). Although not shown in FIG. 5, the electronic binder might include provisions for animation or the like, such that a collector could playback a baseball player's power hitting swing or a pitcher's move and release. These and other features may be offered using a tool bar 36. The tool bar 36 would also include a key 38 for returning to the presentation page 24 shown in FIG. 4. Of course, the functions on the tool bar 36 would preferably be performed by mouse input or the like.

The manner in which individual electronic trading cards are selected and displayed would be controlled by a file manager and a presentation manager in the electronic binder. The file manager would be responsible for loading each electronic trading card file owned by a collector into a unique address or location, as well as provide for sorting features (e.g., sort all baseball players having a hitting average greater than 0.300, or all pitchers with an ERA below 2.00, etc.) using options 40 in the tool bar 42 (where the functions in the tool bar 42 are accessible by mouse input or the like). The presentation manager would display each of the cards selected in a format similar to that shown in FIG. 4. For large collections, it is likely that not all of the cards could be displayed simultaneously. Therefore, a count button 44 would identify the number of cards a collector has in total or the number of cards the collector has in his or her collection which were identified using a sort function, and a scroll button 46 would be used to display the next series of electronic trading cards (e.g., to see 19–27 cards, the collector might select the scroll button 46 three times).

An important feature of this invention is that it allows collecting duplicate electronic trading cards since identical files will be separately stored in different locations. This is accomplished by using a copy manager in the electronic binder to load all new electronic trading cards into different locations, and then using a duplicate copy detector to determine when any of the electronic trading card files in the electronic binder are identical. The presentation manager would then assure that only non-duplicate copies of an electronic trading card are displayed. FIG. 4 shows that indicia 48 would appear on a particular electronic trading card to indicate to the collector the number of that particular trading card the collector has in his or her collection. For example, FIG. 4 shows the collector has two copies of electronic trading card #2. If the collector has more than two copies of one card, the indicia 48 would so indicate, and, if the collector has duplicates, triplicates, etc. of different cards, indicia 48 would be provided on each of those cards as well.

A big part of the appeal of trading cards is the ability to trade them with other collectors. However, if collectors can retain copies of an electronic file and also trade copies of them, their collections would rapidly expand and, thereby, limit some of the attraction of collecting (i.e., part of collecting is to accrue items which others do not have). Also, this would make it difficult for suppliers of electronic trading cards to make a profit on the production of electronic trading cards. Thus, this invention specifically contemplates allowing a collector of electronic trading cards to trade files with other collectors, but to not retain files he or she has chosen to trade.

Figure 6:
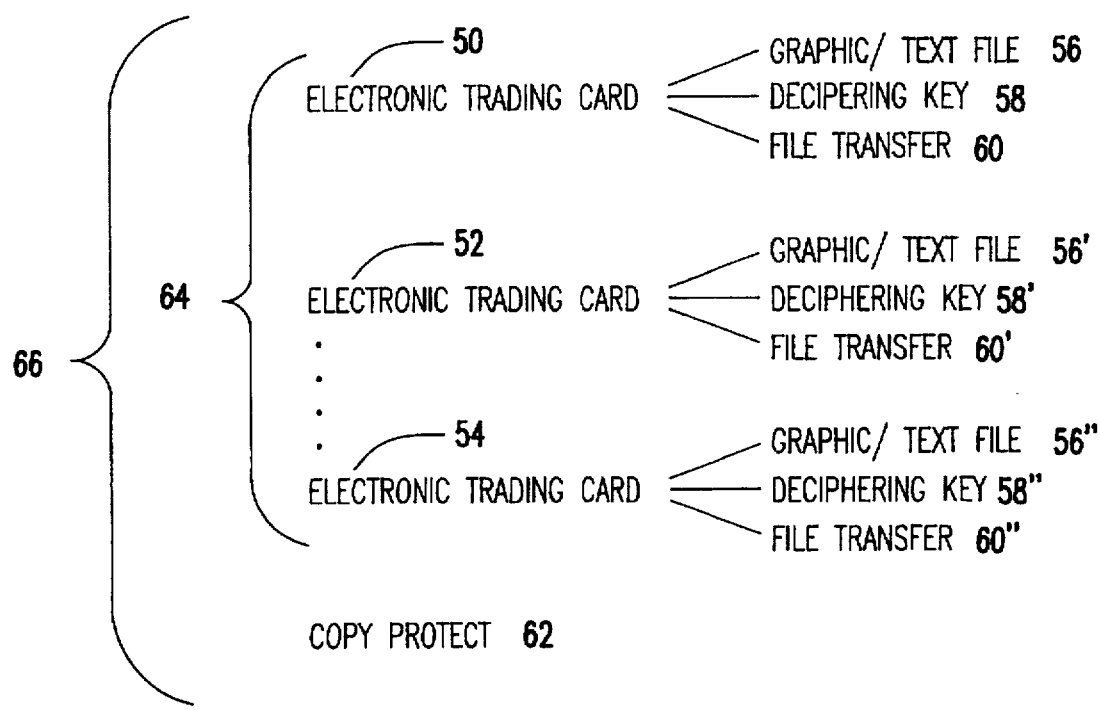
FIG. 6 is a schematic view of the individual files on an electronic trading card.

FIG. 6 shows one example of a file format used by the suppliers of electronic cards and a file transfer manager in the electronic binder to achieve the collection and tradeability of electronic trading cards. A collector will purchase a data storage device that includes a plurality of electronic trading card files 50, 52, and 54, the number of such files can vary considerably and will be dependent on the needs of the supplier, as well as the types of information being stored on the data storage device and the storage capacity of the storage device. For example, with baseball cards, a collector may be provided with nine or ten cards on a single data storage device. Once loaded into the collector's electronic binder, each of the trading card files 50, 52, and 54, will be stored in unique locations or addresses. Each electronic trading card 50, 52, and 54 includes an electronic trading card file having graphic and/or textual information 56, 56', and 56" such as, for example, a baseball player's picture and his statistics, biography, profile, etc. The graphic and/or textual information 56, 56' and 56" would be encrypted so that it cannot be viewed with out a key. A unique deciphering key code 58, 58', and 58" would be associated with each graphic/text file, and would be used by the presentation manager to unlock the encryption scheme such that the graphic/text files 56, 56' and 56" could be reviewed on a computer screen. Also, a unique file transfer code 60, 60' and 60" would be associated with each electronic trading card 50, 52 and 54 which would be used to allow the card to be traded.

To limit the use of the data storage device, a copy protect code 62 would be included on each data storage device. Preferably, this code would allow the collection of files 64 to be electronically transferred a fixed number of times determined by the electronic trading card supplier. One transfer would be preferred; however, it may be advantageous to allow a collector retain the data storage device for archival purposes, in which case a total of two transfers would be allowed. After the files 64 have been copied from the data storage device the prescribed number of times, the copy protect code would render all files 66 on the data storage device unusable.

To trade an electronic trading card, a collector will copy the complete contents of the card 50, 52, and 54 to a temporary storage medium such as a computer diskette, or to another collector's permanent storage medium such as a hard disk by modem-to-modem wire transfer or by other means. This is accomplished using a file transfer manager in the electronic binder which activates a file transfer code 60, 60', or 60" for the specific card 50, 52, or 54. At the time of the file transfer to a second collector, the file transfer code 60, 60', or 60" will also render the electronic trading card 50, 52 or 54 unusable to the first collector making the transfer. This will be accomplished by either deleting or modifying (i.e., scrambling code, etc.) one or all of the following in the first collectors electronic binder on his or her primary storage medium (e.g., hard disk, etc.): the electronic trading card file including graphics/text 56, 56' or 56"; the deciphering key code 58, 58', or 58"; or the file transfer code 60, 60' or 60".

Thus, the second collector receives all of the "sub-files" for any one trading card (e.g., for electronic trading card 50, the collector receives the graphic/text file 56, deciphering key code 58, and file transfer code 60), and the first collector is unable to use that trading card after it is traded. However, because the second collector receives all of the sub-files, he or she can trade that file again to another collector, in which case he or she would become the "first collector" in the transaction as described above. If only the file transfer code 60, 60' or 60" is rendered unusable during a trade, the first collector would still retain the ability to view the electronic trading card 50, 52, or 54, but he or she would no longer have the ability to trade the card again.

While the preferred embodiment has described a collection of electronic trading cards on a data storage device where the cards are drawn from a large computer database pool, a supplier of electronic trading cards may also want to offer "special edition" trading cards in combination with the ordinary electronic trading cards. These "special edition" cards would be the same as the ordinary electronic trading cards with respect to collectability and tradeability (e.g., preferably can be electronically traded once, encrypted, stored and handled using the electronic binder, etc.); however, they would offer a unique feature not found in the ordinary electronic trading cards and would be drawn from a separate computer database pool. For example, the special feature may be an audio and/or video clip that would be activated for playback by the collector on his or her computer equipment. Alternatively, the "special edition" card could simply be drawn from a separate pool of cards designated by the supplier for reasons chosen by the supplier. The special edition trading card might include a graphic designation identifying it as a "special edition" card that is displayed in the binder. In the preferred embodiment, a limited amount of edition trading cards (and preferably one) would be provided on the data storage device with the other electronic trading cards, and this special edition trading card would be drawn from a different pool from the pool used for the other electronic trading cards.

While the electronic binder has been discussed in terms of various programs (e.g., file manager, copy manager, presentation manager, file transfer manager, duplicate copy detector) it will be apparent to those of skill in the art, that each of these items could be one part of a single large computer program.

While the invention has been described in terms of its preferred embodiments, those skilled in the art will recognize that the invention can be practiced with modification within the spirit and scope of the appended claims.

I claim:

1. Electronic trading cards, comprising:
   a data storage device;
   a plurality of electronic trading card files stored on said data storage device, each electronic trading card file including encrypted data relevant to a single member of a pool;
   a plurality of deciphering key codes on said data storage device each of which is unique and which is associated with only one of said electronic trading card files, said deciphering key codes being required to decipher said encrypted data in said electronic trading card file;
   a plurality of file transfer codes on said data storage device each of which is unique and which is associated with only one of said electronic trading card files, each of said file transfer codes being used to transfer a selected electronic trading card file, an associated deciphering key for said selected electronic trading card file, and an associated file transfer code for said selected electronic trading card file between a plurality of electronic storage mediums other than said data storage device, each of said file transfer codes, when electronically operated while said electronic trading card files are present in a storage medium other than said data storage device, cause at least one of the group consisting of said electronic trading card files, said deciphering key codes, and said file transfer code to be rendered unusable on said storage medium; and copy protection code on said data storage device which allows at least one of the group consisting of said electronic trading card files, said deciphering key codes, and said file transfer codes to be copied from said data storage device a selected number of times.

2. The electronic trading cards of claim 1 wherein said selected number of times in said copy protection code is one.

3. The electronic trading cards of claim 1 wherein said selected number of times in said copy protection code is two.

4. The electronic trading cards of claim 1 wherein said encrypted data in said electronic trading card files includes both graphic data and text data.

5. The electronic trading cards of claim 4 wherein said single member is a sports figure and said pool comprises a plurality of sports figure in a selected sports, and wherein said graphic data is a picture of said sports figure and said text data includes statistics and personal information relevant to said sports figure.

6. The electronic trading cards of claim 1 wherein said data storage device is a magnetic or optical disk.

7. An electronic binder for electronic trading cards, comprising:

a file manager for organizing a plurality of electronic trading card files each of which includes data relevant to a single member of a pool, each of said electronic trading card files being stored in a unique location in said file manager and wherein identical electronic trading card files are stored in separate unique locations;

a copy manager for copying electronic trading card files into said file manager;

a presentation manager for presenting said data in said electronic trading card files on a computer screen, said presentation manager accessing each of said electronic trading card files from said file manager, said presentation manager alternatively presenting data from a single electronic trading card file or data from a plurality of different electronic trading card files;

duplicate copy detecter for determining when a plurality of electronic trading card files are identical and determining the number of identical electronic trading card files for each of said electronic trading card files in said plurality of electronic trading card files, said presentation manager presenting an indication of the number of identical trading card files for each of said electronic trading card files in said plurality of electronic trading card files and suppressing simultaneous presentation of data of identical trading card files on a computer screen; and a file transfer manager for activating a file transfer code selected from a plurality of file transfer codes each of which is unique and which is associated with only one of said electronic trading card files, each of said file transfer codes being used to transfer a selected electronic trading card file and an associated file transfer code for said selected electronic trading card file between a plurality of electronic storage mediums.

8. The electronic binder of claim 7 wherein each of said electronic trading card files is encrypted and includes an associated deciphering key code, and wherein said file transfer code activated by said file transfer manager transfers said associated deciphering key code for said electronic trading card file between a plurality of electronic storage mediums at the same time as said electronic trading card file and associated file transfer code are transferred between first and second storage mediums of said plurality of electronic storage mediums and causes at least one of the group consisting of said electronic trading card files, said deciphering key codes, and said file transfer code to be deleted from a first storage medium when said electronic trading card file is transferred from said first storage medium to said second storage medium, and further comprising a deciphering manager for activating said associated deciphering key code to decipher the encryption of said electronic trading card files.

9. The electronic binder of claim 7 further comprising an updateable computerized guide including data relevant to a plurality of individual members of a group of electronic trading card files.

10. An electronic trading card manufacturing apparatus, comprising:

database including data for each of several members of a selected pool, the data for each member of said selected pool being assembled into a single electronic trading card file;

computerized selecter for randomly selecting a plurality of electronic trading card files from said database to be copied to a data storage device seperate from said database; and computerized copier for producing electronic trading cards on said data storage device each of which includes (i) said plurality of electronic trading card files, each electronic trading card file including encrypted data relevant to a single member of said selected pool, (ii) a plurality of deciphering key codes each of which is unique and which is associated with only one of said electronic trading card files, said deciphering key codes being required to decipher said encrypted data in said electronic trading card file, (iii) a plurality of file transfer codes each of which is unique and which is associated with only one of said electronic trading card files, each of said file transfer codes being used to transfer a selected electronic trading card file, an associated deciphering key for said selected electronic trading card file, and an associated file transfer code for said selected electronic trading card file between a plurality of electronic storage mediums other than said data storage device, each of said file transfer codes, when electronically operated while said electronic trading card files are present in a storage medium other than said data storage device, cause at least one of the group consisting of said electronic trading card files, said deciphering key codes, and said file transfer code to be deleted from said storage medium, and (iv) copy protection code which allows at least one of the group consisting of said electronic trading card files, said deciphering key codes, and said file transfer codes to be copied from said data storage device a selected number of times.

11. The electronic trading card manufacturing apparatus of claim 10 wherein said encrypted data in said electronic trading card files includes both graphic data and text data.

12. The electronic trading manufacturing apparatus of claim 11 wherein said single member is a sports figure and said pool comprises a plurality of sports figure in a selected sports, and wherein said graphic data is a picture of said sports figure and said text data includes statistics and personal information relevant to said sports figure.

13. The electronic trading card manufacturing apparatus of claim 10 further comprising:

- a second database including data for each of several members of a second selected pool, the data for each member of said second selected pool being assembled into a single electronic trading card file; and
- a means for randomly selecting one electronic trading card file from said second selected pool in said second database to be copied to said data storage device.

* * * * *